April 18, 1933.  J. J. MADINE  1,904,154
ELECTRODE FOR DISCHARGE TUBES
Filed Nov. 28, 1927
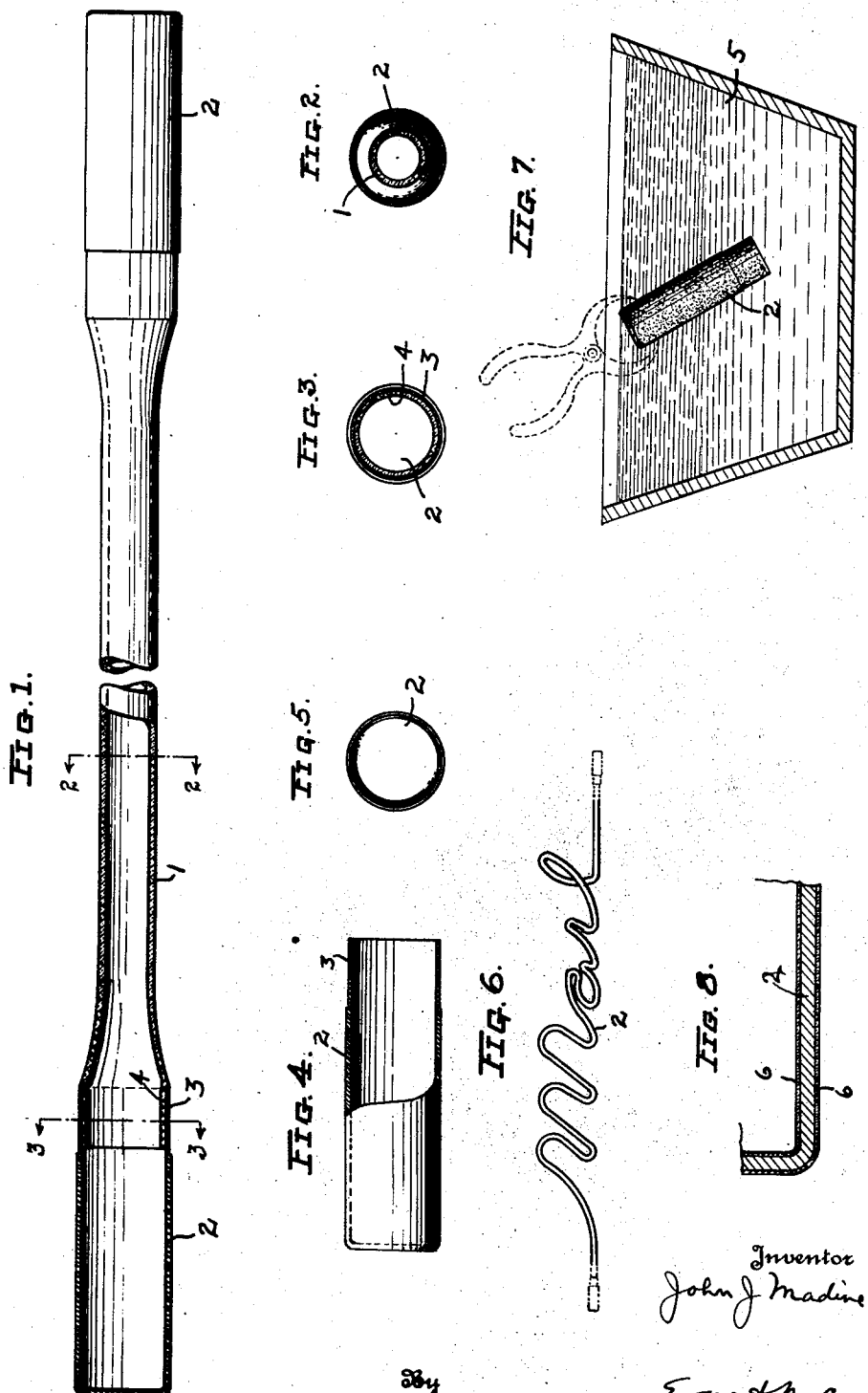

Patented Apr. 18, 1933

1,904,154

UNITED STATES PATENT OFFICE

JOHN J. MADINE, OF CLEVELAND, OHIO, ASSIGNOR, BY MESNE ASSIGNMENTS, TO FLEXLUME CORPORATION, OF TONAWANDA, NEW YORK, A CORPORATION OF NEW YORK

ELECTRODE FOR DISCHARGE TUBES

Application filed November 28, 1927. Serial No. 236,201.

This invention relates to new and useful improvements in luminous electrical discharge tubes and particularly to luminous tubes containing an inert gas such as neon which are extensively used in luminous signs.

In my copending application Serial No. 166,857, filed February 9, 1927, I have disclosed a luminous electrical discharge tube having cup shaped copper electrodes which seal the ends of the tube. The present invention embodies an electrode of similar form and is an improvement over the tube and method disclosed in said application.

The principal objects of the present invention are: to lessen the cost of manufacture of such tubes, to increase the life of the tube, and to maintain the quality of the light by excluding impurities from the luminescent gaseous medium within the tubes.

The features of the present invention which make for economy in the manufacture of the tubes are: a method of manufacture by which a perfect seal between the glass tube and metal electrode is more easily made, making it unnecessary to employ highly skilled labor for this operation; the provision of an electrode which does not need to be subjected to the tedious and expensive degasification process prior to its attachment to the glass tube; and the provision of an electrode in which the surface is relatively impervious to the passage of gases in either direction.

In continuous operation of ionic discharge tubes having internal electrodes of the customary type the pressure within diminishes, thus decreasing their brilliancy and shortening their life. This loss of pressure and its resultant deterioration of the tubes is largely due to the physical and chemical absorption of the gaseous medium by the metallic electrodes which takes place during the operation of the tubes. In the course of deterioration, fine particles of the metal from the electrodes are gradually deposited on the walls of the tubes near the respective electrodes and form a thin metal coating on the glass which also occludes the gaseous medium Consequently, the pressure is greatly diminished until the resistance of the tube becomes too high for current to flow. To revive and continue the life of ionic discharge tubes of this type, it has been necessary to periodically "rebombard" the tube in order to degasify and clean the electrodes.

The present invention provides an electrode which has the surface thereof which is exposed to the interior of the tube covered with a thin vitreous coating of a salt which at its fusing temperature has a tendency to spread over and adhere to the surface of the metal of the electrode.

In order to secure such a spreading of the salt over the surface of the electrode, it is essential to select a salt of such character that a strong cohesion exists between the salt and the surface of the metal. The surface of the metal may be considered to have a surface tension with respect to air and also with respect to the fused salt which itself also has a surface tension with respect to the air. If the surface tension of the metal with respect to the salt and of the salt with respect to the air is less than that of metal with respect to the air, the salt will spread on the metal in a very thin film in the same way in which some oils will spread on water. Such coating may be so thin in places as to be difficult to demonstrate by microscopic means and yet sufficient to profoundly alter the physical behavior of the metal. This coating serves to prevent the passage of any gas occluded in the electrode from the electrode into the gaseous medium within the tube, to prevent absorption of gases by the electrode, to prevent the passage of metallic particles from the electrode into the gaseous medium within the tube and also facilitates the sealing of the electrode to the glass tube.

In tubes of this character as heretofore manufactured, the passage of gases from the electrode to the interior of the tube, the absorption of gases by the electrode and the discharge of metallic particles from the electrode which coat the inner surface of the glass adjacent the electrode and absorb the gaseous light producing medium has seriously affected the life of the tube, and the gases and metallic particles from the electrode have made it impossible to maintain the pure color of the neon or other gaseous medium employed, unless elaborate degasifying means were used.

With reference to the objects as above set forth and other objects which may hereinafter appear, the invention may be said to comprise the luminous tube and method of making the same as illustrated in the accompanying drawing, hereinafter described and particularly set forth in the appended claims, together with such variations and modifications thereof as will be apparent to one skilled in the art to which the invention appertains.

Reference should be had to the accompanying drawing forming a part of this specification in which:

Figure 1 is a side elevation of a tube embodying the invention, one end being broken away and shown in section.

Fig. 2 is a section taken on line 2—2 of Fig. 1.

Fig. 3 is a section taken on line 3—3 of Fig. 1.

Fig. 4 is a side elevation of the electrode with the open end thereof in section.

Fig. 5 is an end view looking toward the open end of the electrode.

Fig. 6 is a view showing the tube bent to form a sign.

Fig. 7 is a view showing the manner in which the electrode is dipped in the salt solution to coat the electrode.

Fig. 8 is an enlarged fragmentary sectional view of a portion of the electrode with the coating thereon.

Referring to the accompanying drawing, the luminous tube comprises a glass tube 1 of any suitable glass which may be bent to any desired shape to form a word, symbol or design as illustrated in Fig. 6 of the drawing and thimble shaped electrodes 2 which seal the ends of the tube, the tube containing an inert gas such as argon, helium or neon, which is made luminous upon the passage of an electric current through the tube.

The electrodes 2 are of cylindrical form closed at one end and are preferably formed from commercially pure sheet copper.

The cylindrical wall has a very thin portion 3 at its open end which is drawn out by spinning or any other suitable method to a thickness which is but a small fraction of the thickness of the main portion of the wall. This thin portion at the open end facilitates the joining of the electrode to the open end of the glass tube, the end of the glass tube being raised substantially to fusing temperature and inserted in the open end of the electrode. The electrode may, if desired, be made of larger diameter than the glass tube and joined to an enlarged end portion 4 of the tube.

The present invention is concerned chiefly with the electrodes 2 and the method of treating the same prior to their attachment to the glass tubes to coat the surfaces of the electrode with a coating 6, which isolates the electrode from the gaseous medium such as neon in the tube and eliminates the objectionable absorption and contamination of the gaseous medium in the tube incident to the use of internal metallic electrodes. The coating is in the form of a salt fused into a substantially uniform thin film over the surface of the electrode. Salts such as used to improve the sealing in qualities of wire may be employed for the coating, such salts when fused on the surface of the metal tending to spread out in a thin layer or film adhering to the surface of the metal.

Examples of salts suitable for the purpose are the borates and metaphosphates though, of course, it will be understood that other glassy coatings such as vitreous enamels may be used.

To apply the coating to an electrode, the electrode is first heated to a bright red heat such as 600 to 800° C. Preferably, the flame is a faintly luminous reducing flame to reduce any oxides and vaporize and burn off any grease on the surface of the metal. The electrode while still incandescent is then plunged open end downward into a liquid bath 5 as shown in Fig. 7, consisting of a salt solution to cause the salt to be deposited upon the surface of the metal. It will be seen that by this process both the interior and exterior surfaces of the electrode will be coated with a thin vitreous non-metallic coating. It is preferable to provide the coating on the exterior of the electrode as well as on the interior in order to absolutely prevent any transmission of gas through the thin metallic electrode and also to protect the outer surface of the electrode and afford heat insulation. When luminescent tubes are used with mercury vapor, it is a distinct advantage to have the electrodes sufficiently heat insulated so that the heat generated may be used to vaporize the mercury.

It will also be seen that as the coating on the copper electrode has far less heat conductivity than metallic copper that the electrode so coated will be heated with far greater difficulty in a glass blower's flame. This tends to make the process of sealing the copper to glass easier as there is less chance of heating the copper to fusion while the glass is being heated sufficiently to cause it to seal to the metal.

A solution which has been found to give excellent results is a solution of sodium borate and boric acid in water, the proportions being, for example, about 25 grains of sodium borate and about 15 grains of boric acid and 65 c. c. of distilled water.

The proportions of the salt in the solution may be varied considerably, depending upon the metal it is desired to coat and the glass it is desired to seal to. A salt made as in the example above is super-saturated at ordinary temperatures and should, therefore, be heated to a suitable temperature to dissolve the salts. It is therefore preferable to have the solution warm or hot at the time of plunging the heated thimble into it. The plunging of the heated thimble shaped electrode open end downward into the solution has been found to be very important since this results in a much more uniform deposit of salt upon the interior surface of the electrode than would otherwise be obtained, the more uniform deposit of the salt being perhaps due to the action of steam trapped within the electrode, retarding the flow of solution contacting with the heated walls. Upon removal of the thimble from the borate solution, it is again heated to a temperature somewhat lower than at the first heating to fuse the salt and cause the same to form a thin uniform film over the entire surface of the metal. A hotter flame may be employed for the second heating in order to quickly bring the electrode to the desired temperature.

The coating which is produced by the method above described is nearly pure sodium borate slightly colored with copper and this coating on the thin walled end portion which receives the glass tube fuses when the heated end of the glass tube is inserted in the end of the electrode and assists in the formation of a more intimate union and a more perfect seal between the glass and copper. This coating is also impervious to gases and prevents absorption of the luminescent gaseous medium by the electrode, and discharge of metal particles from the electrode as well as preventing the passage of any gases occluded in the metal electrode into the luminescent gaseous medium.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A luminous electrical discharge tube having a metal electrode which is isolated from the gaseous medium within the tube by a thin coating composed of a borate.

2. A luminous electrical discharge tube comprising a glass tube closed at one end by a metallic thimble shaped electrode having its inner surface coated with a thin film of a fused salt on said surface.

3. A luminous electrical discharge tube comprising a glass tube closed at one end by a metallic thimble shaped electrode having its inner surface coated with sodium borate.

4. An electrode for luminous electrical discharge tubes formed of copper and coated upon its interior surface with a thin film composed of a salt which when fused tends to spread on a copper surface.

5. An electrode for luminous electrical discharge tubes formed of copper and coated with a thin film composed of a borate.

6. A thimble shaped copper electrode for luminous electrical discharge tubes having upon its interior surface a thin coating composed of a borate.

7. A luminous electrical discharge tube having a metal electrode for conducting electric current to the gaseous medium within the tube, said electrode having a surface presented to the gaseous medium which is coated with a thin vitreous film which substantially isolates said surface from the gaseous medium and prevents disintegration of the electrode metal.

8. A metal electrode for luminous electrical discharge tubes which is coated with a thin vitreous film to prevent disintegration of the electrode metal.

9. A luminous electrical discharge tube comprising a glass tube closed at one end by a metallic thimble-shaped electrode which has its inner surface presented to the gaseous medium within the tube, said inner surface being coated with a thin vitreous film which substantially isolates said surface from the gaseous medium and prevents disintegration of the electrode metal.

10. A discharge tube comprising a glass tube sealed at one end by a metallic thimble-shaped electrode coated on its interior surface with a thin vitreous film.

11. A luminous electrical discharge tube comprising a sealed glass tube containing a current-conducting gas of the noble monatomic group and having a metal electrode for conducting electrical current to the gaseous medium within the tube, said electrode having its surface exposed to the gaseous medium and coated with a thin film of fused salt which separates it from the gaseous medium within the tube and prevents disintegration of the electrode metal.

12. A luminous electrical discharge tube comprising a glass tube and a metallic, cup-shaped electrode having its open end disposed toward the electronic stream, and having its edge protected against the electronic stream, the surface of the electrode being coated with a thin, vitreous film which prevents disintegration of the electrode metal.

13. A luminous electrical discharge tube comprising a sealed glass tube containing a current-conducting gas of the noble monatomic group and having a cup-shaped electrode with its open end disposed toward the electronic stream, said electrode being protected against the disintegrating action of the electronic stream by a thin coating composed of a fused salt.

In testimony whereof I affix my signature.

JOHN J. MADINE.